United States Patent Office 2,823,133
Patented Feb. 11, 1958

2,823,133

PARTING AGENT FOR MOLDS

Antonio J. Salvador, Dallas, Tex.

No Drawing. Application March 21, 1955
Serial No. 495,826

1 Claim. (Cl. 106—38.25)

This invention relates to the art of plaster molding and it has particular reference to an improved sealer parting agent for use in plaster molding operations.

The principal object of the invention is to provide a mold release compound for the ready separation of epoxy resin castings from plaster cavities, particularly in the production of plaster models for plastic drill jigs, checking and welding fixtures and many other machine elements in aircraft and other plants. The invention is equally effective as a parting agent for plastic, wood or metal molds and finds use for taking plaster casts from plaster or wood patterns, saving considerable surface preparation time.

Another object of the invention is to provide a new composition of matter which includes finely divided particles of petroleum wax, stearic acid, a solvent consisting of kerosene or white gasoline, especially in cases where a plastic cast is to be cured under heat. To the foregoing is added starch as a sealing agent in the finished product which latter has a grease-like consistency and is applied to the mold cavities by a brush for the best results as to uniformity in thickness of the coating applied.

The following description of the compound embodying the invention relates to the ingredients in their respective proportions for producing twenty gallons of the product.

| | | |
|---|---|---|
| Petroleum tallow (wax) | pounds | 25 |
| Stearic acid | do | 20 |
| Kerosene or white gasoline | gallons | 10 |
| Starch | pounds | 1 |

The wax herein referred to is known to the trade as amber wax 190/195 M. P. and consists of approximately three-fourths tallow and one-fourth stearic acid. Blocks or chunks of the petroleum tallow or wax are initially reduced to finely divided particles as by grinding. To the ground wax is added the stearic acid and kerosene as a solvent.

The mass is cooked for a period of three hours in a suitable vessel at 212° F. While the mixture is being cooked, starch as a by-product of corn, potatoes or other starchy substance is added and mixed with the mass as a sealer in the compound and which also contributes to the product of smoothness characteristic of cold cream which facilitates uniform application to a mold cavity.

In cases where a plastic cast is to be cured under heat, better results are obtained by substituting white gasoline for the kerosene ordinarily used. Gasoline is also employed as a thinner for the compound which is reduced to a slurry consistency and applied to the surface of a mold cavity with a brush.

Plaster mold making techniques are well known in the trade, hence are not herein defined. However, it is pointed out that the cast mold is usually given one or two coats of lacquer, after which the parting compound or separator of the invention is applied. After having brushed the parting agent onto the mold cavity surfaces, it is left to penetrate the latter for a period of four or five minutes. Excess material is then removed from the mold by means of a soft tissue whereupon the mold is ready for laminating or casting the resin.

In using the parting agent in plaster to plaster or plastic to plaster molding, it is desirable that operations be carried out in a room heated slightly above ordinary room temperature of 70° F. In such cases, the parting agent should be thinned with kerosene.

Manifestly, in the compound or composition of matter hereindescribed, certain minor changes in the proportion of ingredients and substitution of equivalents may be made as may fall within the spirit of the invention and defined in the annexed claim therefor.

What is claimed is:

The hereindescribed process for producing a plaster mold parting agent which comprises heating a mixture of amber wax, stearic acid and kerosene to a temperature of 212° F., maintaining said temperature approximately three hours while adding to the mixture starch as a sealing agent.

References Cited in the file of this patent

UNITED STATES PATENTS

| | | |
|---|---|---|
| 189,729 | Habermehl | Apr. 17, 1877 |
| 2,103,527 | Goodyear | Dec. 28, 1937 |